United States Patent
Bhat

(10) Patent No.: US 8,798,648 B2
(45) Date of Patent: Aug. 5, 2014

(54) METHODS AND APPARATUS FOR MANAGING MESSAGES

(75) Inventor: Hamsika Bhat, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 378 days.

(21) Appl. No.: 12/967,301

(22) Filed: Dec. 14, 2010

(65) Prior Publication Data

US 2012/0149405 A1    Jun. 14, 2012

(51) Int. Cl.
  *H04W 4/00* (2009.01)
(52) U.S. Cl.
  USPC ........................................................ 455/466
(58) Field of Classification Search
  USPC ........... 455/412.2, 466, 412.1, 418, 425, 566, 455/405, 415, 552.1, 414.1; 709/206, 207; 370/352; 379/88.13, 88.18
  See application file for complete search history.

(56) References Cited

U.S. PATENT DOCUMENTS

| | | | |
|---|---|---|---|
| 6,424,829 B1 | 7/2002 | Kraft | |
| 2005/0282563 A1* | 12/2005 | Wardimon | 455/466 |
| 2006/0148496 A1 | 7/2006 | Zhu et al. | |
| 2008/0153459 A1 | 6/2008 | Kansal et al. | |
| 2008/0171536 A1* | 7/2008 | Katz | 455/412.2 |
| 2009/0006285 A1 | 1/2009 | Meek et al. | |
| 2009/0215432 A1* | 8/2009 | Matsuoka | 455/412.2 |
| 2010/0022260 A1 | 1/2010 | Chang | |
| 2010/0075638 A1 | 3/2010 | Carlson et al. | |

OTHER PUBLICATIONS

International Search Report and Written Opinion—PCT/US2011/064984—ISA/EPO—May 31, 2012.

* cited by examiner

*Primary Examiner* — Kiet Doan
(74) *Attorney, Agent, or Firm* — Kristine U. Ekwueme

(57) ABSTRACT

Methods and apparatus for managing messages may include receiving at a mobile device a message, such as a short message service (SMS) message. The methods and apparatus may further include determining a message priority for the message by comparing a source of the message with a set of rules defining the message priority. The methods and apparatus may further include determining one or more groups for the messages based upon the priority and placing the messages into the determined groups.

35 Claims, 10 Drawing Sheets

METHODS AND APPARATUS FOR MANAGING MESSAGES

BACKGROUND

In today's world, wireless communication systems are widely deployed to provide various types of content, including voice, video, music, text and data, for example. Wireless devices, such as cellular telephones or handheld devices having wireless connection capability are deployed leveraging the wireless communication system by users for communicating and interacting with each other. In addition, with increasing number of short message service (SMS) messages received by users of wireless devices, it has become difficult to manage and/or handle the large number of SMS messages received. For example, users may receive a number of messages that are not important to the user, e.g., spam messages, mass marketing messages and/or mass advertising messages.

Users may typically select to view all SMS messages in the order of arrival. Thus, as the number of SMS messages increase, it may become more difficult to identify the more important messages. Therefore, there remains a need in the art for methods and systems that organize incoming messages so users can quickly and easily identify messages of importance to the user.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

One aspect relates to a method of managing messages. The method may include receiving, at a mobile device, a message. The method may also include determining a message priority for the message by using a set of rules defining the priority. In addition, the method may include determining one or more groups for the message based upon the message priority. The method may further include placing the message in the one or more groups.

Another aspect relates to at least one processor configured to manage messages. The processor may include a first module for receiving, at a mobile device, a message. The processor may also include a second module for determining a message priority for the message by using a set of rules defining the priority. Further, the processor may include a third module for determining one or more groups for the message based upon the message priority. Moreover, the processor may include a fourth module for placing the message in the one or more groups.

Yet another aspect relates to a computer program product. The computer program product may include a computer-readable medium including at least one instruction for causing a computer to receive, at a mobile device, a message. The computer-readable medium may further include at least one instruction for causing a computer to determine a message priority for the message by using a set of rules defining the priority. The computer-readable medium may also include at least one instruction for causing a computer to determine one or more groups for the message based upon the message priority. In addition, the computer-readable medium may include at least one instruction for causing a computer to place the message in the one or more groups.

Another aspect relates to an apparatus. The apparatus may include means for receiving, at a mobile device, a message. The apparatus may also include means for determining a message priority for the message by using a set of rules defining the priority. Moreover, the apparatus may include means for determining one or more groups for the message based upon the message priority. Furthermore, the apparatus may include means for placing the message in the one or more groups.

Still another aspect relates to an apparatus for managing messages. The apparatus may include a receiving component operable to receive, at a mobile device, a message. The apparatus may further include a priority component operable to determine a message priority for the message by using a set of rules defining the priority. The apparatus may also include a grouping component operable to determine one or more groups for the message based upon the message priority. In addition, the apparatus may include the grouping component is further operable to place the message in the one or more groups.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described aspects relate to methods and apparatus for managing received messages which may include using algorithms to define a message priority based upon the source of the information. In addition, the described aspects may group the messages based upon the message priority. The messages may be listed in each group in a descending order with the highest priority message listed first.

The described aspects may further include determining a priority for each of the one or more groups. The groups may be labeled with the group's priority and displayed in an order based upon the group priority. Thus, the groups with the highest priority may be listed first.

Figure 1:
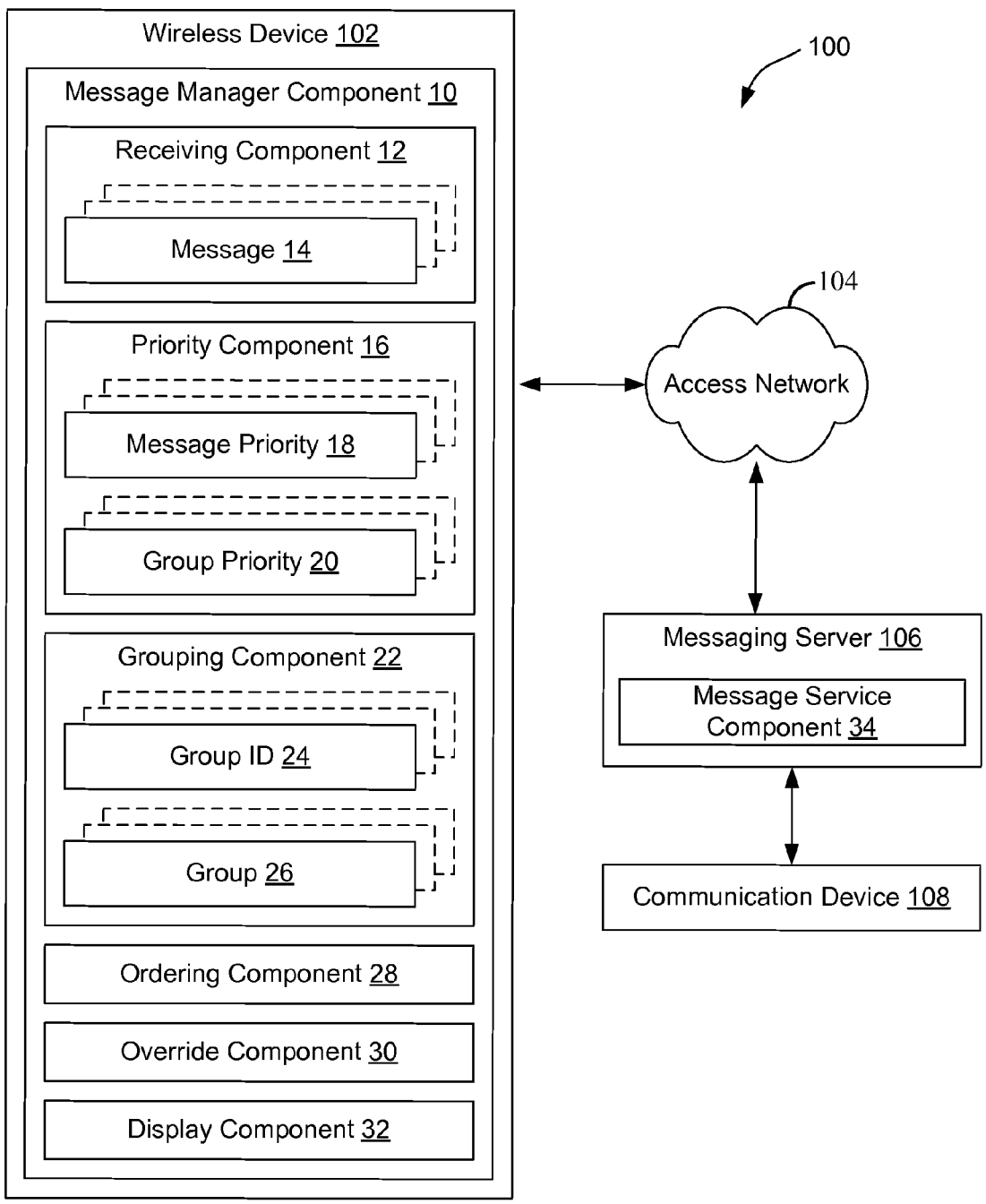
FIG. 1 is an illustration of a connectivity system in accordance with an aspect.

Referring now to FIG. 1, illustrated is an example connectivity system 100 that includes one or more wireless devices 102 and communication devices 108 communicating through one or more access networks 104 with one or more messaging servers and/or computing devices 106. Wireless device 102 and/or communication device 108 may include any mobile or portable computing or communications device, such as a cellular device, that may connect to an access network 104. Wireless device 102 and/or communication device 108 may be, for example, a cellular telephone, a navigation system, a computing device, a camera, a PDA, a music device, a gaming device or a handheld device having wireless connection capability, among other devices. Messaging server/computing device 106 may include any mobile or fixed computing device connected to a network. Messaging server/computing device 106 may include, but is not limited to, a computing device, a server, a cellular telephone, a camera, a PDA, a music device, a gaming device, a navigation system, or a handheld device having wireless connection capability, among other devices. Furthermore, access network 104 may provide one or more types of communication connections, such as any type of wireless airlink, to wireless device 102, communication device 108 and server 106. Wireless device 102 may place and/or receive a communication, e.g., a telephone call, a video conferencing call, an Internet Protocol session, such as a SKYPE™ session, a voice over internet protocol (IP) call, a short message service (SMS) message, a multimedia messaging service (MMS) message, an instant messaging (IM) service message, a chat or net-meeting related connection, a video, music, or data transfer, among other communications, via access network 104 to one or more servers 106. In addition, wireless device 102 may receive a communication via access network 104 from one or more servers 106, or from any other device in communication with access network 104, such as communication device 108.

Wireless device 102 may include a message manager component 10 operable to organize and display messages received at wireless device 102. Message manager component 10 may include a receiving component 12 operable to receive one or more messages 14. Messages 14 may include, but are not limited to, a short message service (SMS) message, a multimedia messaging service (MMS) message, an instant messaging (IM) service message, and an e-mail message, among other messages. For example, message manager component 10 may communicate with the message service component 34 to receive one or more messages 14 from communication device 108. Thus, message service component 34 may send the received messages from communication device 108 to the receiving component 12 on wireless device 102.

Wireless device 102 may also include a grouping component 22 operable to group the received messages 14 into one or more groups 26 using one or more grouping algorithms. Grouping algorithms may include, but are not limited to, grouping based upon sender information (e.g., friends, family, co-workers, banks, service providers, and/or advertising agents, among other sender information), message priority, the date and/or time the message was received, or subject matter, among other algorithms for grouping the messages. The grouping algorithms may also include grouping the messages into one or more subgroups. Subgroups may include, but are not limited to, groups based upon message priority (e.g., high priority, medium priority, or low priority), greetings, acknowledgements, due dates for bills, jokes, or forwarded messages, among other subgroups. Thus, the grouping algorithms may place the received messages 14 into one or more groups 26 and/or one or more subgroups.

In addition, grouping component 22 may also include one or more group identifications (ID) 24 for associating one or more messages 14 with one or more groups 26. Thus, if message 14 is associated with more than one groups 26, one or more groups IDs may be associated with message 14. Grouping component 22 may also receive inputs indicating what groups 26 messages 14 should belong to. For example, grouping component 22 may receive inputs from a user indicating one or more groups 26 for message 14.

Wireless device 102 may further include a priority component 16 operable to assign one or more message priorities 18 to messages 14. In addition, priority component 16 may further be operable to assign a group priority 20 to the one or more groups 26. The priority value may be, for example, a number, a temporal value (e.g., the date and/or time when the message was sent), a ranking (e.g., first, second, third), or a level of urgency (e.g., high, medium, low, urgent, non-urgent), a color (e.g., red for an urgent message), or an icon or symbol (an exclamation point for an urgent message), among other priority values. In one aspect, grouping component 22 may communicate with priority component 16 to use the messages priorities 18 and/or group priorities 20 for determining what groups 26 the message 14 should be grouped with.

In another aspect, the priority component 16 may communicate with an ordering component 28 operable to rank the messages 14 and/or groups 26 based upon priority. Thus, the ordering component 28 may communicate with the priority component 16 to determine an order for the messages 14 and/or groups 26 based upon the message priority 18 and/or group priority 20. In one aspect, the messages 14 may be ranked by message priority 18 in descending order, e.g., the messages with the highest priority at the top of a list. In other aspects, groups 26 may be ranked by group priority 20 in descending order, e.g., groups with the highest priority are listed first. In yet other aspects, groups 26 may be ranked based upon the group priority 20, and the messages 14 within the group 26 may be secondarily ranked based upon the message priority 18. For example, groups 26 may be ranked in descending order based upon the group priority 20 and the messages within each group 26 may secondarily be ranked based upon the message priority 18 in descending order.

Wireless device 102 may in addition include an override component 30 operable to receive inputs overriding the message priorities 18, the group priorities 20, and/or the groups 26 of messages 14. For example, wireless device 102 may receiving inputs from other wireless device and server components, such as, but not limited to, a memory or database, a clock, a position location module, a camera, a microphone, a wired or wireless communication interface, a keypad, or a touch sensitive display, among others sources of inputs. The override component 30 may receive inputs from the user placing the messages 14 into different groups 14. In addition, the override component 30 may receive inputs from the user changing the message priority 18 and/or the group priority 20.

Wireless device 102 may further include a display component 32 in communication with, but not limited to, the receiving component 12, the priority component 16, the grouping component 22, and the ordering component 28. The display component 32 may be operable to display the one or more received messages 14 and/or the one or more groups of messages 26, as illustrated in FIGS. 6A-7B and described below. In addition, the display component 22 may display the one or more message priorities 18 and/or the one or more group priorities 20.

Figure 2:
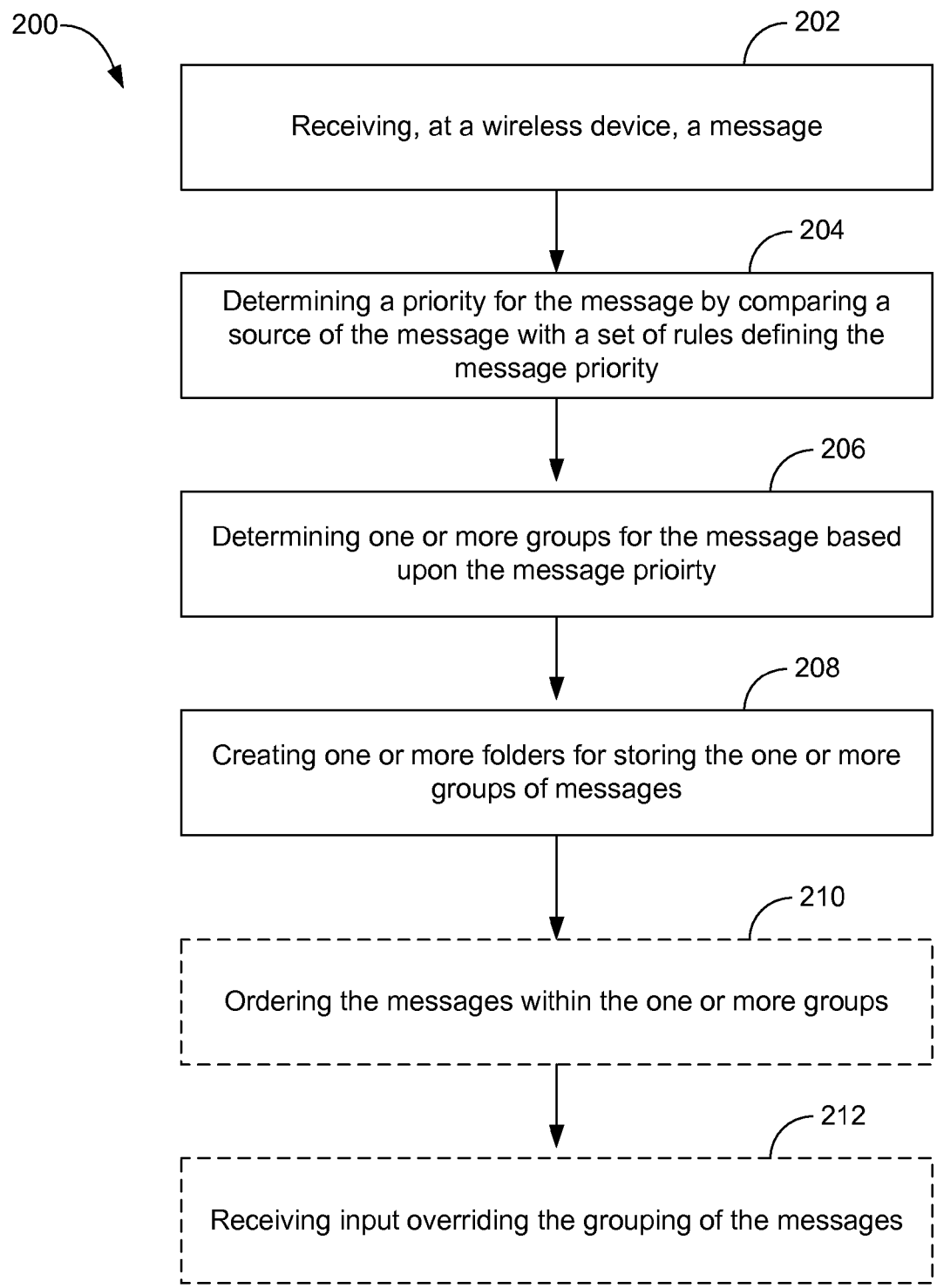
FIG. 2 is an illustration of a flow chart illustrating a method for grouping messages in accordance with an aspect.

Referring to FIG. 2, a method 200 for grouping messages in accordance with an aspect, includes at 202, receiving, at a wireless device, a message. The message may include, but is not limited to, a SMS message, a MMS message, an IM service message, and an e-mail message, among other messages. Next, at 204, the method may include determining a message priority for the message by comparing information about the sender of the message with a set of rules defining the messages priority. An example algorithm for rules defining the message priority is illustrated in FIG. 3.

Figure 3:
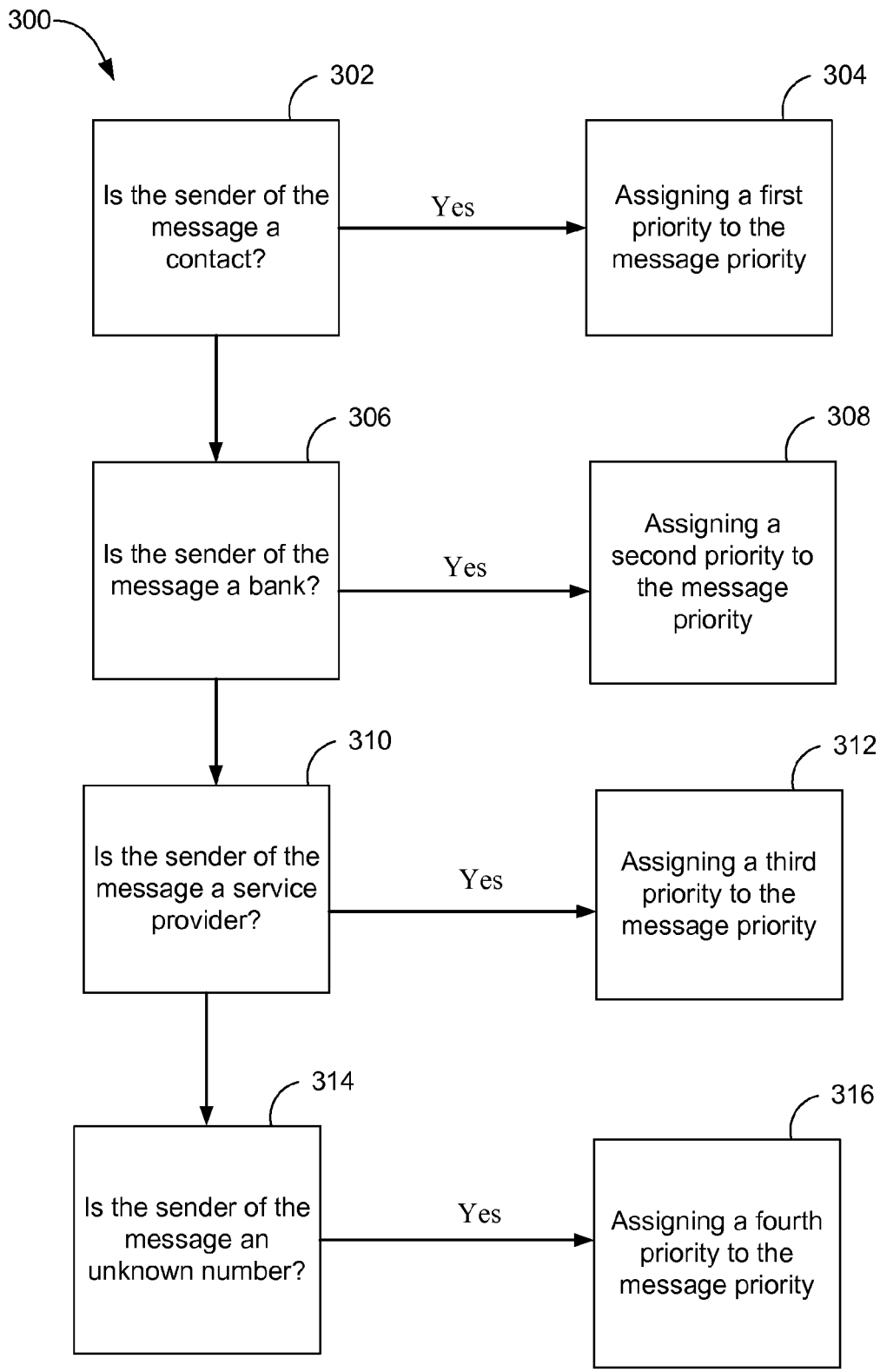
FIG. 3 is an illustration of a flow chart illustrating a method for assigning priorities to a message in accordance with another aspect.

Referring to FIG. 3, a method 300 for assigning priorities to a message in accordance with an aspect, includes at 302, determining whether the sender of the message is a contact from, for example, an address book associated with, e.g., stored on, the wireless device. Contacts may include, but are not limited to, friends, family, and co-workers, among other contacts. For example, priority component 16 (FIG. 1) may compare information about the sender of the message, such as a telephone number or an e-mail address for the sender which may also be associated with a person's identity, e.g., a name in a contact list and/or address book stored on the device, with the telephone numbers and/or names in a contact list of the wireless device to determine whether the sender's information matches with a contact's information. If the sender's information matches a contact's information, at 304, the method may include assigning a first priority to the message priority.

Next at 306, the method may include determining whether the sender of the message is a bank and/or other financial institution. For example, a data repository on wireless device 102 may have information for banks and/or other financial institutions that the user of wireless device 102 associates with. Priority component 16 may compare the sender's information, such as a telephone number or an e-mail address for the sender, with the banking information in the data repository to determine whether the sender of the message is a bank and/or other financial institution. In one aspect, the sender may tag the message with an identifier indicating that the message is from a bank and/or other financial institution. If the sender of the message is a bank or other financial institution, at 308, the method may include assigning a second priority to the message priority.

At 310, the method may further include determining whether the sender of the message is a service provider, such as a utility company, a credit card company, a news provider, a ticketing booking agent, a mobile service provider, an internet service provider, or a retail establishment, among other service providers. A data repository on wireless device 102 may have information for service providers associated with wireless device 102. Priority component 16 may compare the sender's information, such as a telephone number or an e-mail address for the sender, with the service provider's information in the data repository to determine whether the sender is a service provider. Alternatively, the sender may tag the message with an identifier indicating that the message is from a service provider. If the sender of the message is a service provider, at 312, the method may include assigning a third priority to the message priority.

Next, at 314, the method may include determining whether the sender of the message is an unknown number. An unknown number may include, but is not limited to, a number that is not included in the contact list of the wireless device (302), a number that is not from a bank (306), or a number that is not from a service provider (310), among other unknown numbers. If the sender of the message is from an unknown number, at 316, the method may include assigning a fourth priority to the message priority.

Referring back to FIG. 2, at 208, the method may include determining one or more groups for the message based upon the message priority. For example, grouping component 22 (FIG. 1) may use grouping algorithms to place the messages into one or more groups based upon the message priority. In an aspect, the messages may be grouped based upon the priority value assigned to each message, as discussed above in FIG. 3. For example, one group may include messages with a first message priority while another group may include messages with a second message priority. In another aspect, the messages may be placed into groups based upon temporal information of the message, e.g., the date and/or time the message was sent. For example, messages that were received on the same day may be placed into a group. In addition, messages that were received within a time period of a day, e.g., the afternoon, may be placed into a group.

It should be appreciated that various algorithms may be used for determining the groups of messages by using different combinations of looking at the sender information and/or temporal data. In addition, the algorithms may be tuned to determine smaller or larger groupings of messages, e.g. corresponding to smaller or larger ranges of temporal data. An example of an algorithm for grouping the messages is discussed in more detail below in regard to FIG. 5. In an aspect, the user may input the algorithms for grouping the messages.

Next, at 208, the method may include creating one or more folders for storing the one or more groups of content. Thus, once a grouping of messages is identified, the group is stored in a folder specific to that grouping. It should be appreciated that the folders may include a single group of messages or multiple sub-groups of messages depending on the user's preferences and/or the type of algorithm used above in step 206. For example, if the group contains messages from various service providers, the group may be subdivided into subgroups based upon the type of service provider (e.g., a utility company, a credit card company, a ticketing booking agent, a mobile service provider, an internet service provider, or a retail establishment). In addition, the subgroups may be based upon the priority of the messages (e.g., a high priority, a medium priority, or a low priority). It should be appreciated that the groups may be subdivided in a variety of manners.

In an optional aspect, the method may include prompting a user to place the message into one or more groups. Upon receipt of the message a message may be displayed on wireless device 102 (FIG. 1) prompting the user to select a group for the message. For example, a menu with a list of groups may be displayed and the user may select a group for the message. Alternatively, the folders with the groups of messages may be displayed and the user may select one of the groups by selecting the folder. In addition, the user may be prompted to create a new group for the message and input information creating the new group. It should be appreciated that the wireless device may receive the input from the user in a variety of manners. For example, wireless device may receiving inputs from other wireless device and server components, such as, but not limited to, a memory or database, a clock, a position location module, a camera, a microphone, a wired or wireless communication interface, a keypad, or a touch sensitive display, among others sources of inputs.

At 210, the method may optionally include ordering the message within the one or more groups based upon a priority value. For example, the messages with the highest priority value listed first in a descending order. The priority of the message may be pre-assigned by the sender of the message, as discussed below in regard to FIG. 4.

Figure 4:
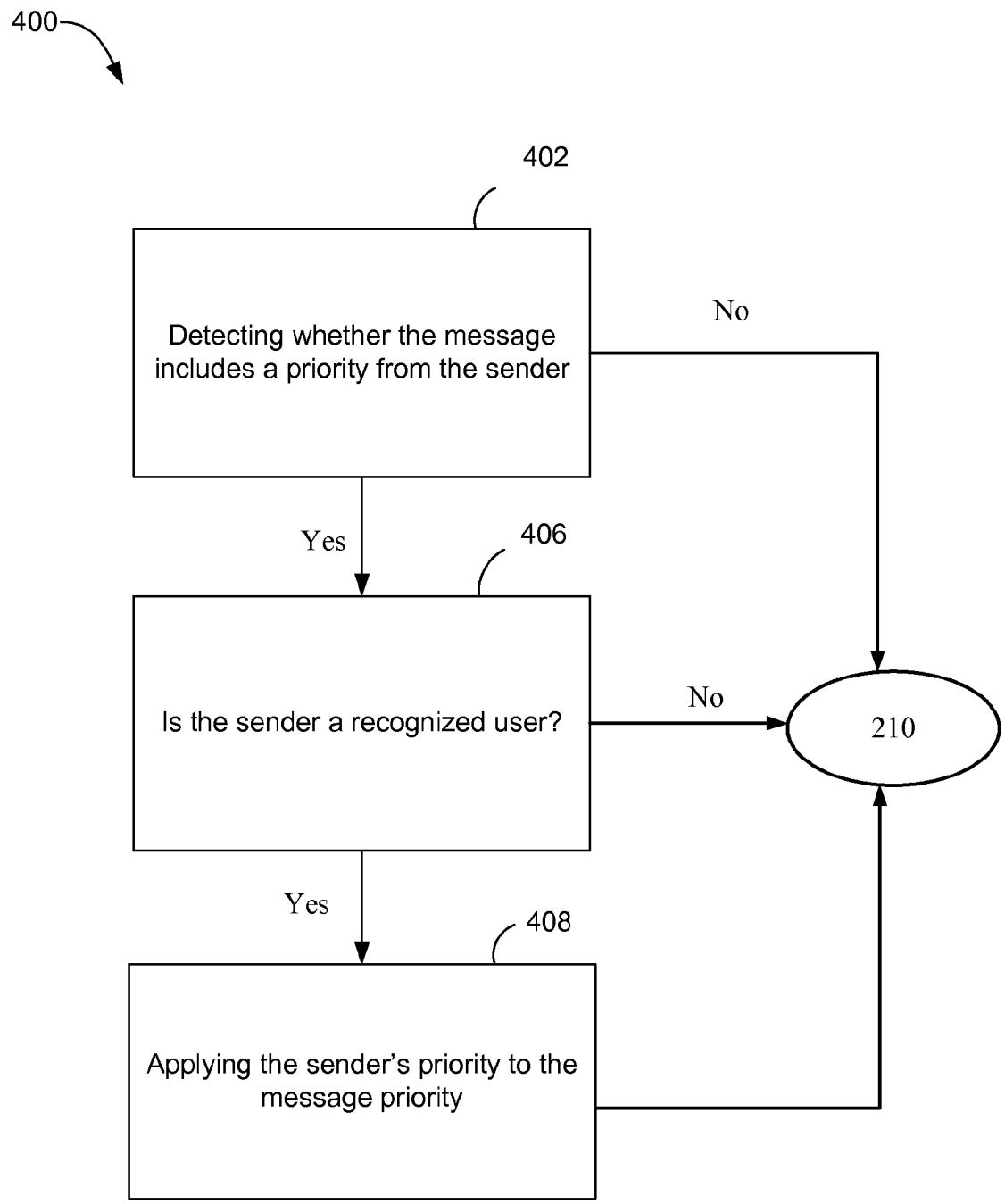
FIG. 4 is an illustration of a flow chart illustrating a method for applying a priority from a sender to a message in accordance with yet another aspect.

Referring to FIG. 4, a method 400 for applying a priority from a sender to a message in accordance with yet another aspect, includes at 402, detecting whether the message includes a priority from the sender. For example, the sender of the message may flag the message with a priority, e.g., a high priority. If the message does not include a priority from the sender, at 404, the method may return to 210 (FIG. 2).

If the message does include a priority from the sender, at 406, the method may include determining whether the sender is a recognized user. A recognized user may be, for example, a contact stored on the wireless device, or any other user the wireless device may associate with (e.g., a bank or service provider). The wireless device may compare the sender's information, e.g., such as a telephone number or an e-mail address for the sender which may also be associated with a person's identity, with a contact list or other data repository to determine whether the sender is a recognized user. If the sender is not a recognized user, at 404, the method may return to 210 (FIG. 2) without applying the sender's priority to the message.

If, however, the sender is a recognized user, at 408, the method may apply the sender's priority as the priority for the message. It should be appreciated that the wireless device may automatically apply a recognized sender's priority to the message.

Referring back to FIG. 2, at 212, the method may optionally include receiving inputs overriding the grouping of the messages. Thus, if the messages are placed into groups based upon the grouping algorithms discussed for example, in 204 and FIG. 3, the user may override the grouping of the messages. For example, the user may select which groups to place the messages in. In addition, the user may override the ordering of the messages by placing the messages in a different order.

Figure 5:
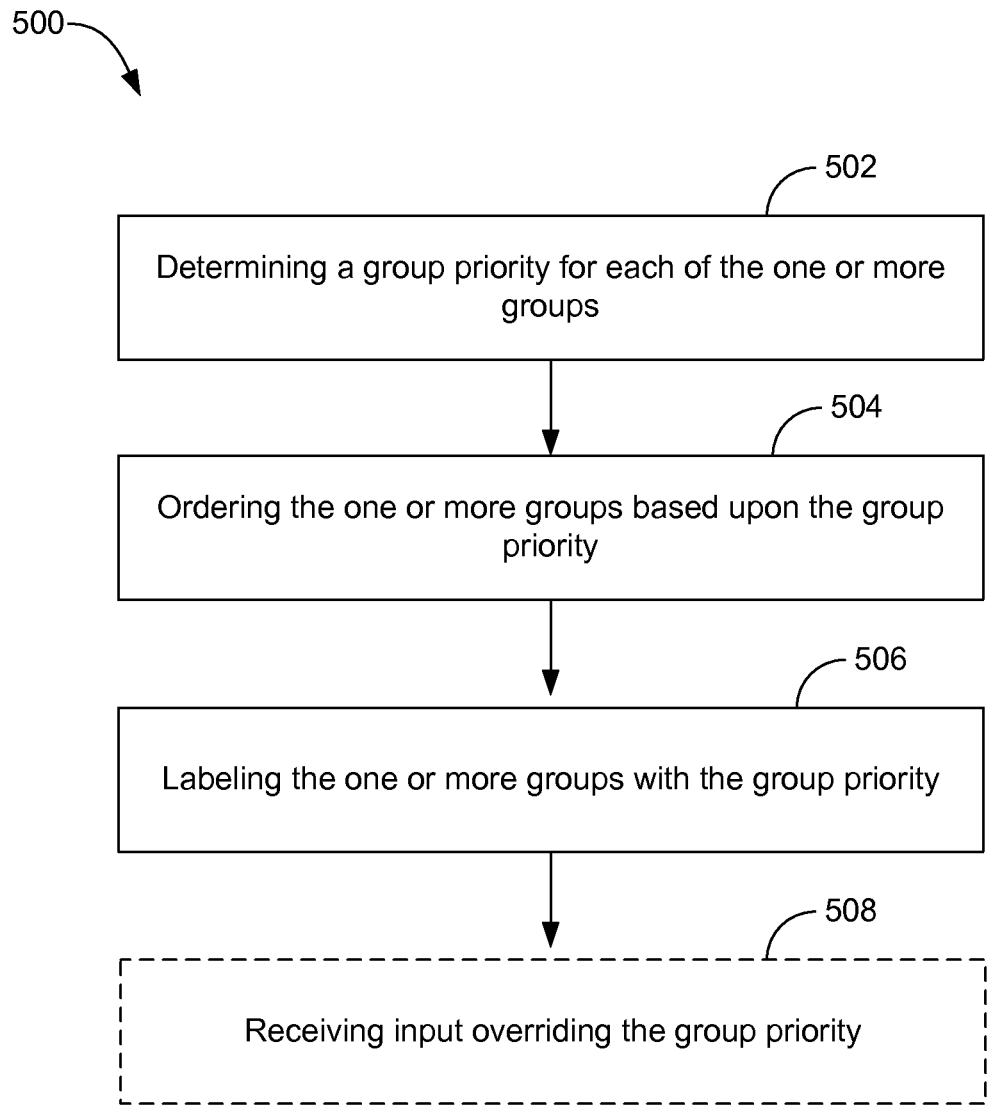
FIG. 5 is an illustration of a flow chart illustrating a method for ranking groups of messages in accordance with another aspect.

Referring to FIG. 5, a method 500 for ranking one or more groups of messages in accordance with another aspect includes, at 502, determining a group priority for each of the one or more groups. In an aspect, wireless device 102 (FIG. 1) may use priority algorithms to determine the priorities for the one or more groups. A priority algorithm may include assigning a priority to the group based upon sender information. For example, groups where the senders are associated with contacts from an address book, the priority algorithm may assign a high priority to the group.

Next, at 504, the method may include ranking the one or more groups based upon the group priority. For example, the groups may be ranked in descending order based upon the groups' priority, e.g., groups with the highest priority may be listed first.

At 506, the method may also include labeling the one or more groups with the group priority. In an aspect, the folders of the groups may be labeled with the priority determined by the priority algorithm in 502. The group with the highest priority may be labeled, for example, with a number one, or with the words "high priority," among other labels. In an aspect, the method may also include labeling the one or more groups with the sender information, e.g., the name of the sender, the telephone number of the sender, and/or the e-mail address of the sender, among other sender information.

The method may optionally include, at 508, receiving input overriding the group priorities. For example, wireless device 102 (FIG. 1) may receive inputs from a user selecting a different ranking for the groups and/or a different label for the one or more groups.

Figure 6A:
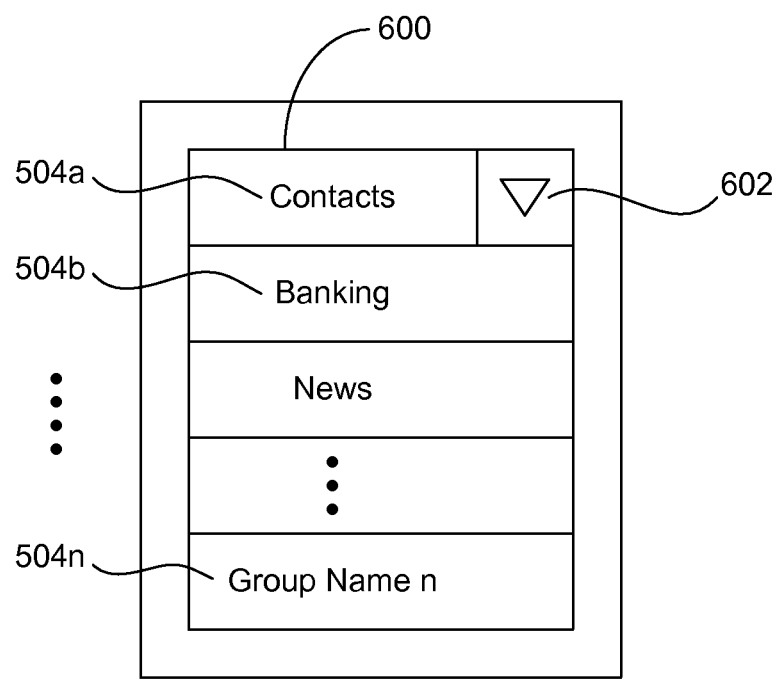
FIGS. 6A and 6B are example screen shots with a list of available groups in accordance with an aspect.
Figure 6B:
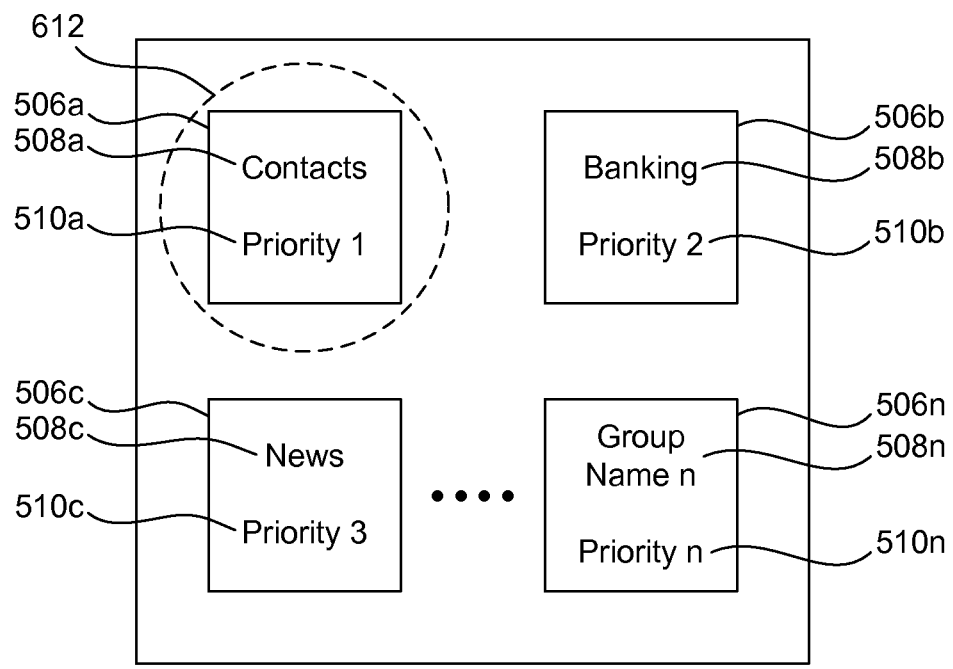
Figure 7A:
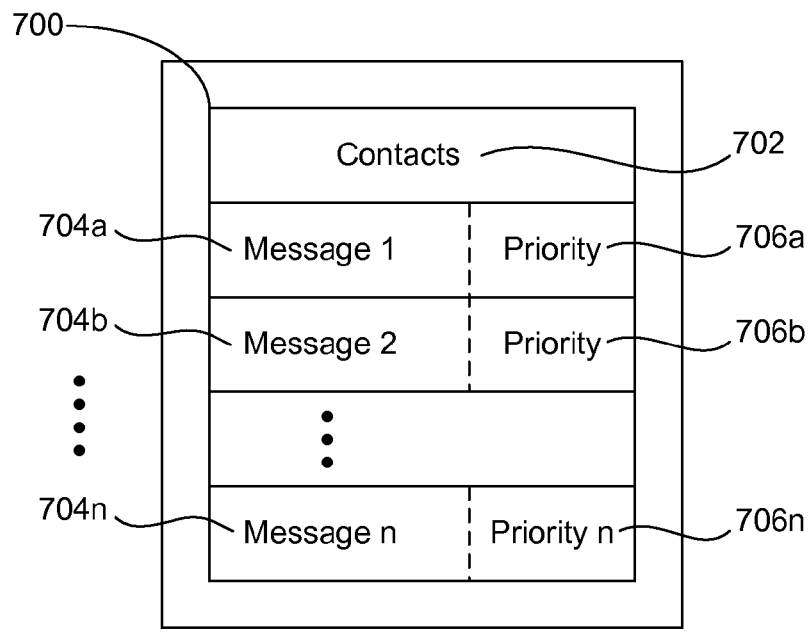
FIGS. 7A and 7B are example screen shots with a list of messages within a group in accordance with yet another aspect.
Figure 7B:
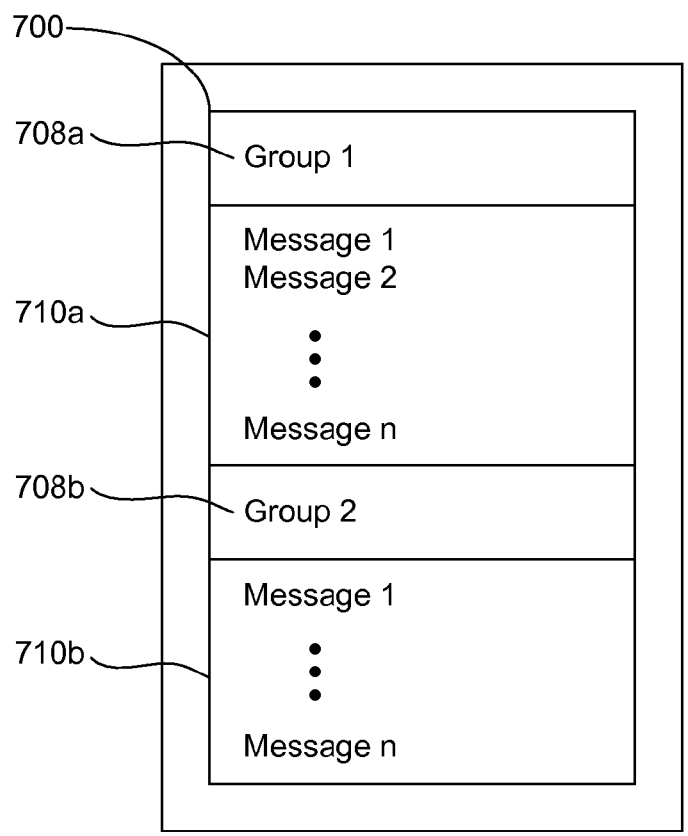

Illustrative examples of displaying the various messages and/or message groups executed with a wireless device in accordance with an aspect are illustrated in FIGS. 6A-7B. Referring now to FIG. 6A, illustrated is an example group list 600 displayed on a wireless device. Group list 600 may include the group names, e.g., 604a-604n, of the groups of messages stored on wireless device. Group list 600 may be displayed in, for example, a drop down menu. The user may select icon 602 to expand the group names 604a-604n. It should be appreciated that group names 604a-604n may be displayed in order based upon the group priority, as discussed above in FIG. 5. For example, the group list 600 may descend from the group with the highest group priority, e.g., 604a, to the group name with the lowest group priority, e.g., 604n. In one aspect, the user may select a group name, e.g., 604a-604n, to review the messages stored within the selected group, as illustrated in FIGS. 7A and 7B. In another aspect, the user may select a group name, e.g., 604a-604n, to add a message to the selected group.

Referring now to FIG. 6B, in another aspect, the group list 600 may be displayed by group folders 606a-606n. Group folders 606a-606n may be labeled with, for example, group names 608a-608n and the group priority 610a-610n. Thus, the group folders 606a-606n may indicate the type of messages stored within the group as well as the priority for the group. In addition, it should be appreciated that the folders may be displayed on the wireless device based upon priority. The folder with the highest priority, e.g., priority 1, may be displayed first and the folders may descend in order based upon priority. In an aspect, the user may select a group, e.g., 612, to review the messages stored within the selected group, as illustrated in FIGS. 7A and 7B. In another aspect, the user may select a group, e.g., 612, to add a message to the selected group.

Referring now to FIG. 7A, illustrated is an example message list 700 displayed for the selected group 606a (FIG. 6B), in accordance with an aspect. Message list 700 may include the messages 704a-704n associated with the selected group 606a. It should be appreciated that the messages may be stored within the message folder 606a or the messages may have a group identifier associating the messages with the message folder 606a. Message list 700 may also include the message priority 706a-706n for the messages 704a-704n. In an aspect, the messages 704a-704n may be displayed in descending order based upon the priority. For example, the messages with the highest priority may be displayed at the top of the list, e.g., 704a, and the messages with the lowest priority, e.g., 704n, may be displayed at the bottom of the list.

Turning now to FIG. 7B, illustrated is another example of displaying a message list 700 in accordance with an aspect. Message list 700 may display the messages 710a, 710b for more than one group of messages, e.g., 708a, 708b. Thus, message list 700 may include a first group 708a and the associated messages 710a for the first group 708a. In addition, message list 700 may include a second group 708b and the associated messages 710b with the second group 708b. It should be appreciated that message list 700 may be displayed in a variety of manners. For example, message list 700 may include, among other features, the date and/or time the message was sent; the name and/or number of the message sender; and text from the message.

Figure 8:
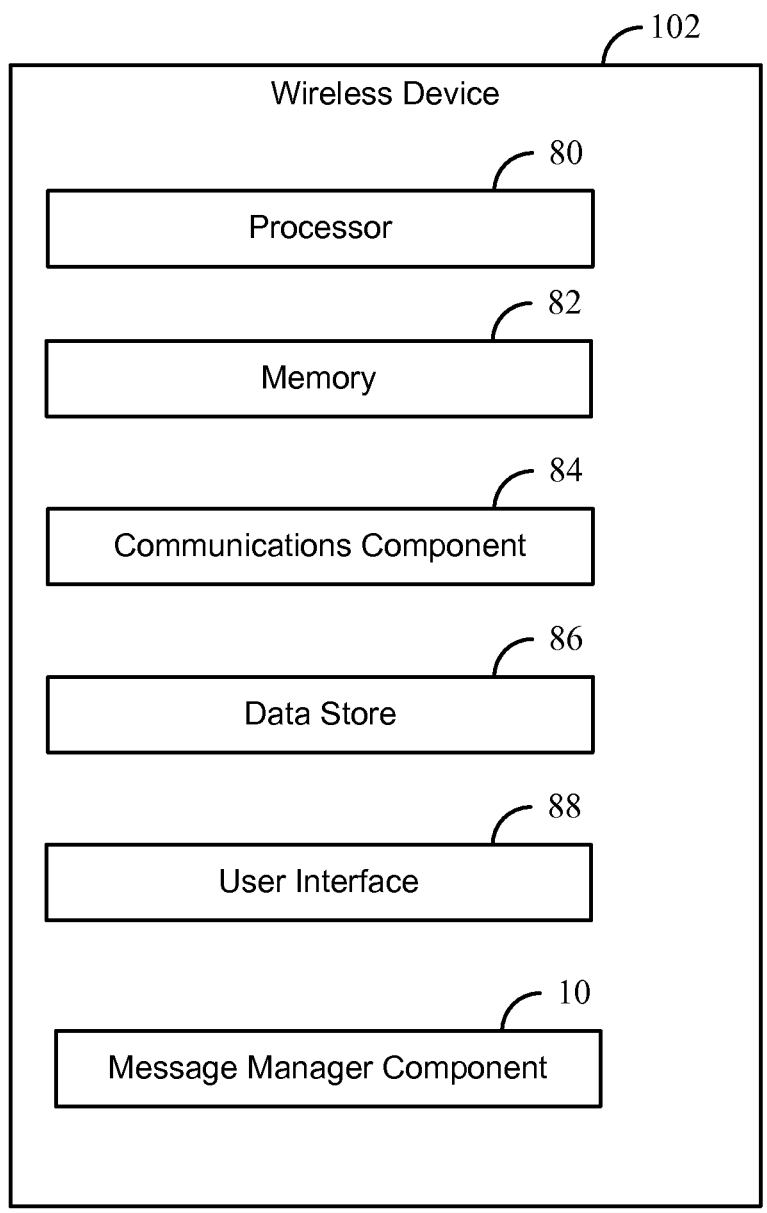
FIG. 8 is an example wireless device operable within the connectivity system in accordance with an aspect.

Referring to FIG. 8, illustrated is an example wireless device 102 operable within the connectivity system in accordance with an aspect. In one aspect, wireless device 102 may include a processor 80 for carrying out processing functions associated with one or more of components and functions described herein. Processor 80 can include a single or multiple set of processors or multi-core processors. Moreover, processor 80 can be implemented as an integrated processing system and/or a distributed processing system.

Wireless device 102 may further includes a memory 82, such as for storing local versions of applications being executed by processor 80. Memory 82 can include a type of memory usable by a computer, such as random access memory (RAM), read only memory (ROM), tapes, magnetic discs, optical discs, volatile memory, non-volatile memory, and any combination thereof.

Further, wireless device 102 includes a communications component 84 that provides for establishing and maintaining communications with one or more parties utilizing hardware, software, and services as described herein. Communications component 84 may carry communications between components on wireless device 102, as well as between wireless device 102 and external devices, such as devices located across a communications network and/or devices serially or locally connected to wireless device 102. For example, communications component 84 may include one or more buses, and may further include transmit chain components and receive chain components associated with a transmitter and receiver, respectively, operable for interfacing with external devices.

Additionally, wireless device 102 may further include a data store 86, which can be any suitable combination of hardware and/or software, that provides for mass storage of information, databases, and programs employed in connection with aspects described herein. For example, data store 86 may be a data repository for applications not currently being executed by processor 80.

Wireless device 102 may additionally include a user interface component 88 operable to receive inputs from a user of wireless device 102, and further operable to generate outputs for presentation to the user. User interface component 88 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 88 may include one or more output devices, including but not limited to a display, a speaker, a haptic feedback mechanism, a printer, any other mechanism capable of presenting an output to a user, or any combination thereof.

Wireless device may also include a message manager component 10 (FIG. 1) operable to organize and display received messages by groups and/or priority.

Figure 9:
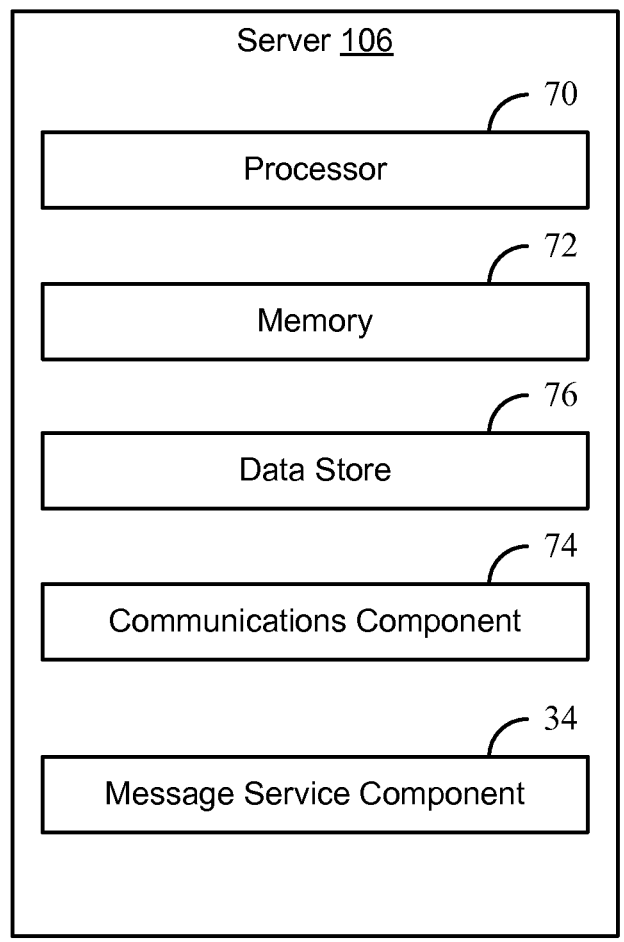
FIG. 9 is an example sever device operable within the connectivity system in accordance with yet another aspect.

Referring now to FIG. 9, illustrated is an example sever device 106 operable within the connectivity system in accordance with yet another aspect. Server 106 manages network connectivity matters for access network 104. Server 106 includes processor component 70 for carrying out processing functions associated with one or more of components and functions described herein. Processor component 70 can include a single or multiple set of processors or multi-core processors. Moreover, processing component 70 can be implemented as an integrated processing system and/or a distributed processing system.

Server 106 further includes a memory 72, such as for storing local versions of applications being executed by processor component 70. Memory 72 can include random access memory (RAM), read only memory (ROM), and a combination thereof.

Further, server 106 includes a communications component 74 that provides for establishing and maintaining communications with one or more parties utilizing hardware, software, and services as described herein. Communications component 74 may carry communications between components on server 106, as well as between server 106 and external devices, such as devices located across a communications network and/or devices serially or locally connected to server 106.

Additionally, server 106 may further include a data store 76, which can be any suitable combination of hardware and/or software, that provides for mass storage of information, databases, and programs employed in connection with aspects described herein. For example, data store 76 may be a data repository for applications not currently executing. Server 106 may also include a message service component 34 operable to receive and send messages across the communication network to one or more wireless devices and/or communication devices.

Figure 10:
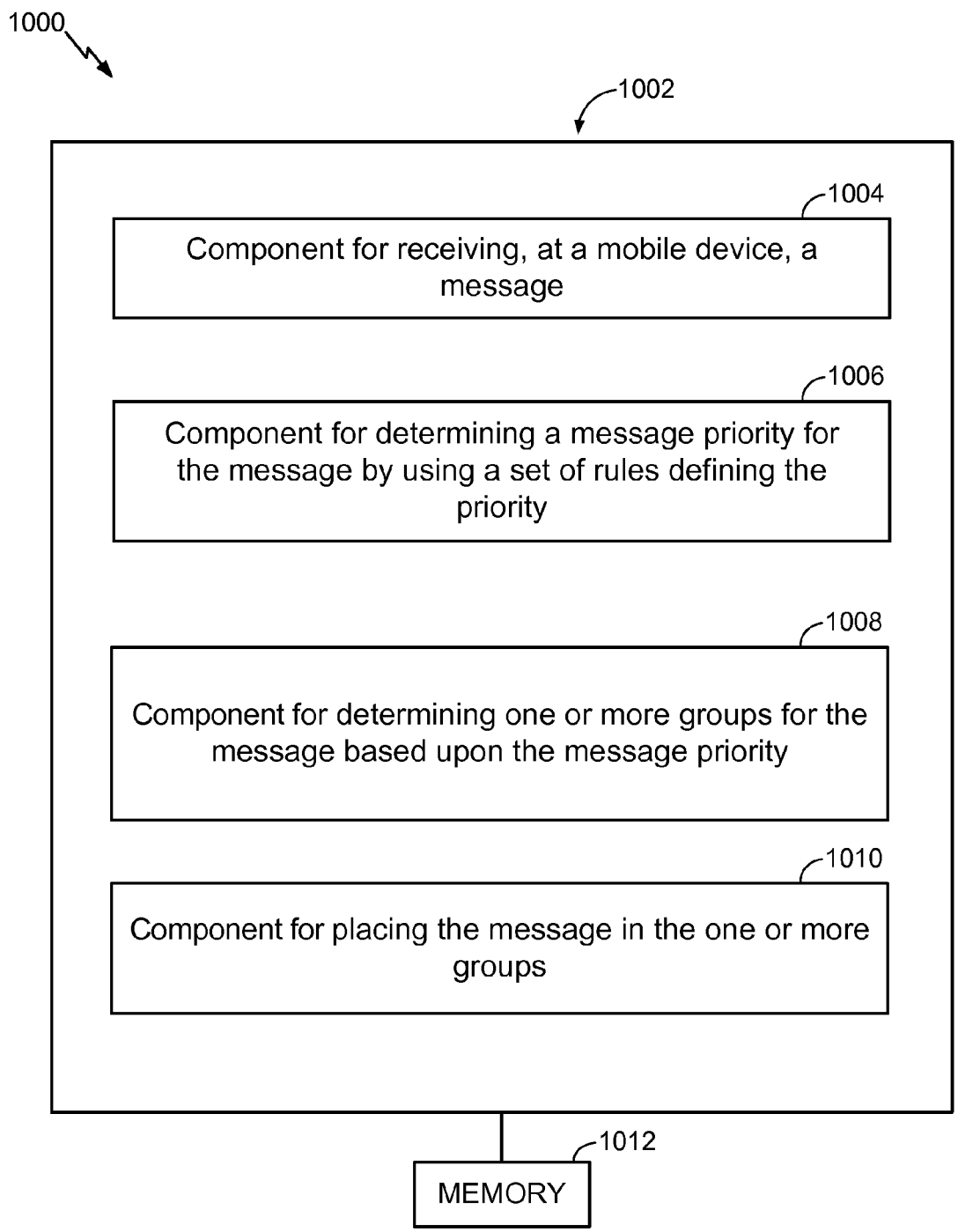
FIG. 10 is an illustration of an example system that facilitates processing messages in accordance with still another aspect.

Turning now to FIG. 10, illustrated is a system 1000 configured to manage messages in accordance with an aspect. For example, system 1000 can reside at least partially within a transmitter, mobile device, etc. It is to be appreciated that system 1000 is represented as including functional blocks, which can be functional blocks that represent functions implemented by a processor, software, or combination thereof (e.g., firmware). System 1000 includes a logical grouping 1002 of electrical components that facilitate managing messages. For instance, logical grouping 1002 may include component 1004 for receiving, at a mobile device, a message. Further, logical grouping 1002 may comprise component 1006 for determining a message priority for the message by using a set of rules defining the priority. In addition, logical grouping 1002 may include component 1008 for determining one or more groups for the message based upon the message priority. Logical grouping 1002 may also include component 1010 for placing the message in the one or more groups. Additionally, system 1000 can include a memory 1012 that retains instructions for executing functions associated with electrical components 1004, 1006, 1008, and 1010. While shown as being external to memory 1012, it is to be understood that one or more of electrical components 1004, 1006, 10010, and 1010 can exist within memory 1012.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

The invention claimed is:

1. A method of managing messages, the method comprising:
   receiving, at a mobile device, a message;
   determining a message priority for the message by using a set of rules defining the priority;
   determining whether the message comprises a priority set by a sender, wherein when the sender is a recognized user, accepting the priority set by the sender and assigning the message priority to the priority set by the sender, and when the sender is not a recognized user, rejecting the priority set by the sender;
   determining one or more groups for the message based upon the message priority;
   placing the message in the one or more groups;
   determining a group priority for the one or more groups; and
   relatively ordering the one or more groups based on the group priority.

2. The method of claim 1, wherein the message comprises one of a short message service (SMS) message, a multimedia messaging service (MMS) message, or an instant messaging (IM) service message.

3. The method of claim 1, wherein the rules define the priority with a value that varies based upon a source of the message.

4. The method of claim 3, wherein a source of the message comprises one of a contact from a contact list, a bank, a service provider, a news provider, a retail establishment, or an unknown number.

5. The method of claim 1, further comprising ranking the message based on the priority.

6. The method of claim 5, further comprising:
   displaying the one or more groups as separate folders in a user interface for received messages, wherein the displaying further includes relatively ordering the one or more groups in a list based on a respective ranking of at least one message in the respective group.

7. The method of claim 6, further comprising:
   displaying each message in each respective folder in a relative order based on the priority of the respective message.

8. The method of claim 5, further comprising:
   receiving an input from a user defining the ranking.

9. The method of claim 1, further comprising:
   labeling the one or more groups based upon the priority.

10. The method of claim 1, further comprising:
    labeling the one or more groups based upon a source of the message.

11. The method of claim 1, further comprising:
    overriding the one or more groups for the message.

12. The method of claim 11, wherein the overriding further comprises:
    receiving an input defining a new group for the message.

13. The method of claim 12, wherein the input comprises receiving a selection from a menu listing the one or more groups.

14. The method of claim 11, wherein the overriding further comprises receiving an input defining a new group priority assigned to the one or more groups.

15. The method of claim 1, further comprising:
    displaying the ordered one or more groups; and
    displaying within each respective group each message in a relative order based on the priority of the respective message.

16. The method of claim 1, wherein the sender is a recognized user if sender information associated with the sender matches a contact in a contact list.

17. At least one processor configured to manage messages, the processor comprising:
    a first module for receiving, at a mobile device, a message;
    a second module for determining a message priority for the message by using a set of rules defining the priority;
    a third module for determining whether the message comprises a priority set by a sender, wherein when the sender is a recognized user, accepting the priority set by the sender and assigning the message priority to the priority set by the sender, and when the sender is not a recognized user, rejecting the priority set by the sender;
    a fourth module for determining one or more groups for the message based upon the message priority;
    a fifth module for placing the message in the one or more groups;
    a sixth module for determining a group priority for the one or more groups; and
    a seventh module for relatively ordering the one or more groups in a list based on the group priority.

18. A non-transitory computer program product, comprising:
    a computer-readable medium comprising:
        at least one instruction for causing a computer to receive a message;
        at least one instruction for causing the computer to determine a message priority for the message by using a set of rules defining the priority;
        at least one instruction for causing the computer to determine whether the message comprises a priority set by a sender, wherein when the sender is a recognized user, accepting the priority set by the sender and assigning the message priority to the priority set by the sender, and when the sender is not a recognized user, rejecting the priority set by the sender;
        at least one instruction for causing the computer to determine one or more groups for the message based upon the message priority;
        at least one instruction for causing the computer to place the message in the one or more groups;
        at least one instruction for causing the computer to determine a group priority for the one or more groups; and
        at least one instruction for causing a the computer to relatively order the one or more groups in a list based on the group priority.

19. An apparatus, comprising:
    means for receiving, at a mobile device, a message;
    means for determining a message priority for the message by using a set of rules defining the priority;

means for determining whether the message comprises a priority set by a sender, wherein when the sender is a recognized user, means for accepting the priority set by the sender and assigning the message priority to the priority set by the sender, and when the sender is not a recognized user, means for rejecting the priority set by the sender;

means for determining one or more groups for the message based upon the message priority;

means for placing the message in the one or more groups;

means for determining a group priority for the one or more groups; and means for relatively ordering the one or more groups in a list based on the group priority.

20. An apparatus for managing messages, the apparatus comprising:

a receiving component operable to receive, at a mobile device, a message;

a priority component operable to determine a message priority for the message by using a set of rules defining the priority;

the priority component being further operable to determine whether the message comprises a priority set by a sender, wherein when the sender is a recognized user, to accept the priority set by the sender and assign the message priority to the priority set by the sender, and when the sender is not a recognized user, to reject the priority set by the sender;

a grouping component operable to determine one or more groups for the message based upon the message priority;

the grouping component is further operable to place the message in the one or more groups;

wherein the priority component is further operable to determine a group priority for the one or more groups; and an ordering component operable to relatively order the one or more groups in a list based on the group priority.

21. The apparatus of claim 20, wherein the message comprises one of a short message service (SMS) message, a multimedia messaging service (MMS) message, or an instant messaging (IM) service message.

22. The apparatus of claim 20, wherein the rules define the priority with a value that varies based upon a source of the message.

23. The apparatus of claim 22, wherein a source of the message comprises one of a contact from a contact list, a bank, a service provider, a news provider, a retail establishment, or an unknown number.

24. The apparatus of claim 20, further comprising an ordering component operable to rank the message based on the priority.

25. The apparatus of claim 24, further comprising:

a display component operable to display the one or more groups as separate folders in a user interface for received messages, wherein the displaying further includes relatively ordering the one or more groups in a list based on a respective ranking of at least one message in the respective group.

26. The apparatus of claim 25, wherein the display component is further operable to display each message in each respective folder in a relative order based on the priority of the respective message.

27. The apparatus of claim 24, wherein the ordering component is further operable to receive an input from a user defining the ranking.

28. The apparatus of claim 20, further comprising:

a message manager component operable to label the one or more groups based upon the priority.

29. The apparatus of claim 20, further comprising:

a message manager component operable to label the one or more groups based upon a source of the message.

30. The apparatus of claim 20, further comprising:

an override component operable to override the one or more groups for the message.

31. The apparatus of claim 30, wherein the override component is further operable to receive an input defining a new group for the message.

32. The apparatus of claim 31, wherein the input comprises receiving a selection from a menu listing the one or more groups.

33. The apparatus of 30, wherein the override component is further configured to receive input defining a new group priority assigned to the one or more groups.

34. The apparatus of claim 20, further comprising:

a display component operable to display the ordered one or more groups and display within each respective group each message in a relative order based on the priority of the respective message.

35. The apparatus of claim 20, wherein the sender is a recognized user if sender information associated with the sender matches a contact in a contact list.

* * * * *